United States Patent [19]
Barr

[11] 3,724,721
[45] Apr. 3, 1973

[54] SACK CUTTING ATTACHMENT FOR A MATERIAL RECEIVING HOPPER

[76] Inventor: Floyd A. Barr, Route 1, Kellogg, Iowa 50135

[22] Filed: Apr. 7, 1971

[21] Appl. No.: 131,939

[52] U.S. Cl. ................................... 222/83.5, 222/88
[51] Int. Cl. .............................................. B67b 7/28
[58] Field of Search ....... 222/80, 81, 82, 83, 83.5, 85, 222/86, 88, 89; 30/123; 83/645, 695; 143/133, 140, 142

[56] References Cited

UNITED STATES PATENTS

| 1,381,930 | 6/1921 | Morgan | 143/133 R |
| 3,348,738 | 10/1967 | Hertlein | 222/88 |
| 51,385 | 12/1865 | Dillingham | 143/133 R |

FOREIGN PATENTS OR APPLICATIONS

| 684,465 | 3/1930 | France | 143/133 R |

*Primary Examiner*—Robert B. Reeves
*Assistant Examiner*—Larry Martin
*Attorney*—Rudolph L. Lowell

[57] ABSTRACT

The attachment comprises a cutting member formed along one side with a series of alternately arranged large and small teeth or serrations. The apex portions of adjacent large teeth are inclined upwardly and outwardly in opposite directions laterally of the cutting member. With the cutting member supported between opposite side walls of a hopper and the serrations projected upwardly from the hopper, a sack, with the transverse dimension thereof extended longitudinally of the cutting member is dropped onto the cutting member, whereby the underside of the sack is cut transversely. The opposite ends of the sack are then manually grasped and moved upwardly and inwardly toward each other to empty the contents thereof into the hopper.

1 Claim, 5 Drawing Figures

PATENTED APR 3 1973
3,724,721
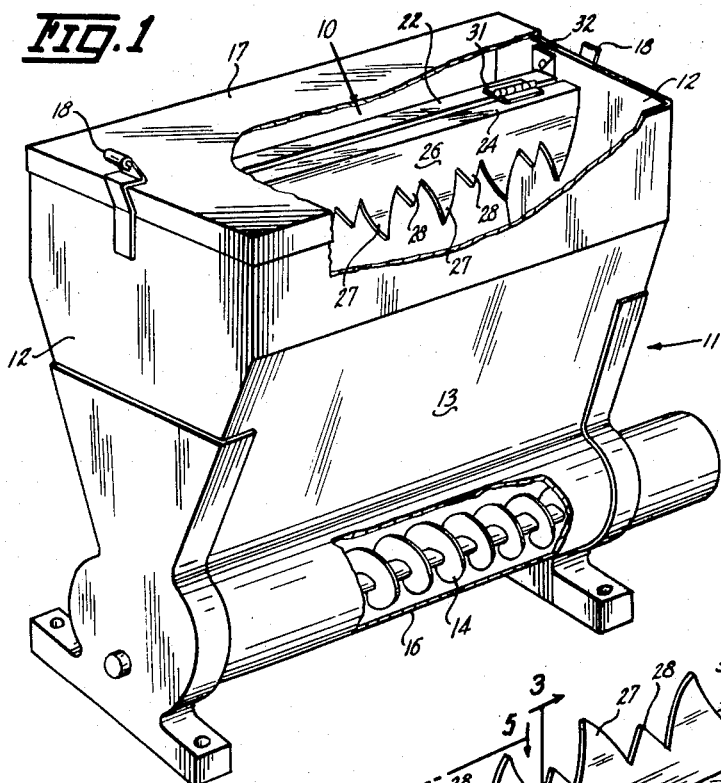
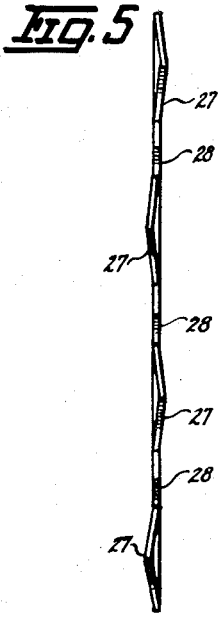
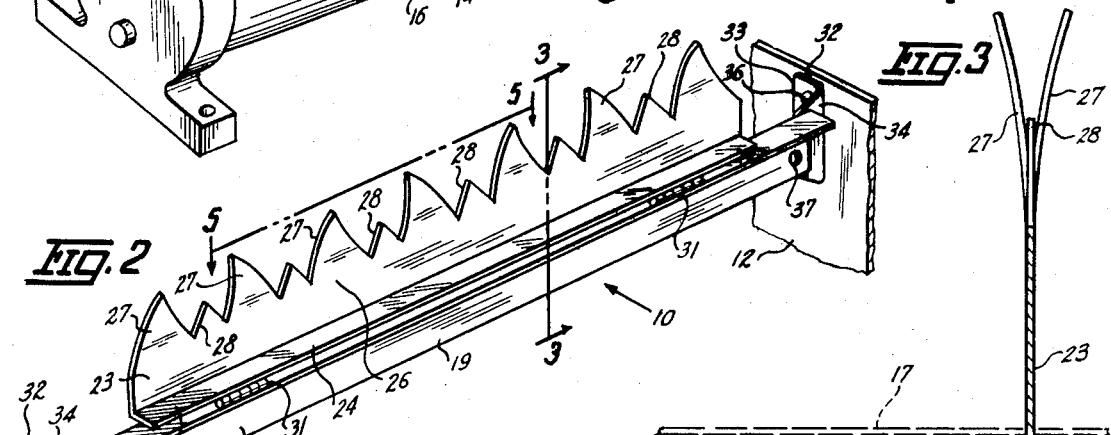
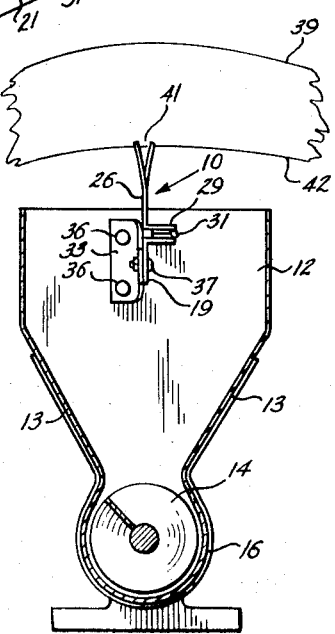
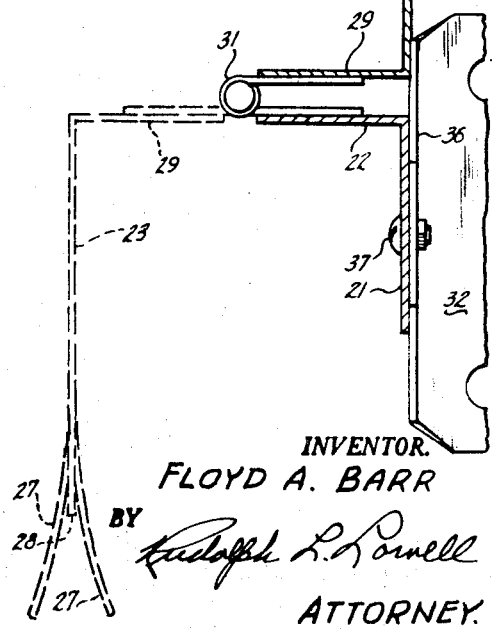
INVENTOR.
FLOYD A. BARR
BY
Rudolph L. Lowell
ATTORNEY.

3,724,721

SACK CUTTING ATTACHMENT FOR A MATERIAL RECEIVING HOPPER

SUMMARY OF THE INVENTION

The invention is of a simple and rugged construction and readily attachable to most type hoppers presently used on fertilizing equipment, mixing mills and the like. The attachment is efficient in operation to cut all types of plastic and paper composition sacks with a minimum of effort and handling of the sack. The sack is picked up and dropped onto the cutting member of the attachment in one continuous movement and then after being cut open is emptied of its contents while in a supported position on the cutting member. When not in use the attachment is located entirely within the confines of the hopper.

BRIEF DESCRIPTION OF THE DRAWINGS

FIG. 1 is a perspective view of the hopper showing the sack cutting attachment of this invention in assembly relation therewith, with parts of the hopper being broken away to more clearly show such assembly;

FIG. 2 is an enlarged perspective view of the sack cutting attachment shown in the upright operating position therefor;

FIG. 3 is an enlarged sectional view of the cutting attachment taken along the line 3 — 3 in FIG. 2;

FIG. 4 is a transverse sectional view of the cutting attachment-hopper assembly with the cutting member shown in operative position relative to a sack being cut; and FIG. 5 is a reduced sectional view of the cutting member taken along the line 5 — 5 in FIG. 2.

DETAIL DESCRIPTION OF THE INVENTION

Referring to FIG. 1, the cutting attachment, designated generally as 10, is shown in assembly relation with a hopper 11 of a type generally used in mixing mills and like equipment for introducing a feed concentrate into the mill for mixing together with a grain feed supplied to the mill. The feed concentrate generally contains vitamins, minerals and proteins for the purpose of supplementing the grain feed and is commercially available in sack containers of a plastic or paper composition. To empty the sacked concentrate into the hopper 11, the sack container is usually initially placed in an upright position on the ground and then opened across the top end thereof. The sack is then picked up and the material therein emptied into the hopper from the open top end of the sack. This procedure requires appreciable handling of the sack along with separately requiring time to open the sack before it can be emptied.

As shown in FIG. 1, the hopper 11 includes a pair of end walls 12 and inwardly inclined side walls 13 having an unloading auger 14 extended longitudinally along its bottom wall 16. When not in use the hopper 11 is closed by a removable cover 17 that is held in closed position by spring clips 18.

The cutting attachment 10 of this invention (FIGS. 1 and 2) includes an elongated mounting member 19 of a right angle shape in transverse cross section so as to have a vertical section 21 and a horizontal section 22. An elongated cutter member 23 formed from a flat plate material has a base section 24 and a serrated or tooth section 26 comprised of a series of longitudinally extended and alternately arranged large teeth 27 and small teeth 28. The base section 24 terminates in a laterally extended flange 29 which is arranged in a back to back relation with the horizontal section 22 of the mounting member 19 so that the cutter member 23 lies in substantially the plane of the vertical section 21.

The horizontal section 22 and the flange 29 are connected together for relative pivotal movement by a pair of hinge units 31 spaced longitudinally of the cutting attachment 10. By virtue of the pivotal connection of the horizontal section 22 with the flange 29 the cutter member 23 is movable from an upright operating position located substantially in the plane of the vertical section 21 to an inoperative position, shown in FIG. 1, projected downwardly in a parallel spaced relation with the vertical section 21. In this inoperative position it will be noted that the flange 29 and vertical section 21 are extended in a side by side relation in a substantially common plane.

A large tooth 27 (FIG. 2) is about twice the size of a small tooth, namely, each small tooth has a pitch and an addendum equal to about one-half the pitch and addendum of a large tooth 27. Additionally, and as best shown in FIG. 3, adjacent ones of the large teeth 27 are reversely inclined upwardly and outwardly relative to a plane common to the base section 24 and small teeth 28 for a purpose to appear later.

In assembling the attachment 10 with the hopper 11 the attachment is extended centrally of the hopper between the end walls 12 for connection of the mounting member 19 with the end walls 12 by end bracket members 32. Each bracket member 32 is of a right angle shape having a first leg section 33 positionable against an adjacent end wall 12 and a second leg 34 projected inwardly of the end wall for positioning against the outer surface of the vertical section 21 of the mounting member 19. The end brackets 32 are secured as by bolts 36 to corresponding end walls 12 at positions vertically of the end walls such that when the cutter member 23 is in its upright operating position, the pitch or base line of the teeth 27 and 28 is located above the level of the upper surfaces of the end walls 12. A single screw connection 37 is used for connecting each end of the mounting member 19 with a bracket 32 to accommodate hopper constructions wherein the end walls are converged inwardly in a downward direction.

In the use of the cutting attachment 10, let it be assumed that the cutter member 23 is in its inoperative position shown in FIG. 1 and located in its entirety below the level of the upper surfaces of the end walls 12 to provide for a closing of the hopper 11 by the cover 17. On removal of the hopper cover the cutting member 23 is manually moved to its upright operative position shown in FIG. 4 determined by the abutting engagement of the hinge sections of each hinge unit 31. A sack container, indicated at 39, in FIG. 4, is then positioned transversely of the hopper 11 with a wide or transverse side 42 thereof facing the cutter member 23. The sack 39 is then dropped onto the cutting member so that the bottom transverse side thereof is initially engaged by the large teeth 27. As a result of the reversed inclination of the teeth 27, and as illustrated in FIG. 5, those portions on the under side 42 of the sack located between adjacent large teeth 27, and indicated at 41, tend to be moved in opposite directions transversely of the cutter member 23. This pulling action tends to straighten out the portions 41 between adjacent large teeth 27 so as to stretch or place these portions under tension. As a result of this induced tension by the large teeth 27, penetration of the portions 41 by the small teeth 28 is facilitated so as to increase the overall cutting efficiency of the cutter member 23.

During the cutting of the sack side 42 by the cutter member 23 opposite ends of the sack 39 fall to supported positions on the hopper side walls 13. Thus, when the sack has been transversely cut it is only necessary to manually grasp and move the sack ends upwardly and inwardly toward each other to provide for a complete emptying of the sack material into the hopper 11. It is desirable that the ends of the cutter member 23 be spaced inwardly from adjacent end walls 12 of the hopper 11 so as to eliminate material being spilled from the hopper during a sack emptying operation.

Sack containers 39 for feed concentrates as well as for granular fertilizers and the like come in 50 pound sizes so as to have a width of approximately 15 inches. In one embodiment of the invention the cutter member 23 is about 14 inches long with each large tooth 27 having a base length or pitch of about 3 inches and an addendum of about 1½ inches. The reverse inclination of these large teeth 27 is at an angle of about 5° relative to the common plane of the small teeth 28 and base section 24. In this embodiment each small tooth 28 has a base length or pitch of 1½ inches and an addendum of three-quarter inches.

Although the invention has been described with respect to a preferred embodiment thereof, it is to be understood that it is not to be so limited since changes and modifications can be made therein which are within the full intended scope of this invention as defined by the appended claims.

I claim:

1. A sack cutting attachment for a material receiving hopper having a pair of end walls comprising:
   a. an elongated cutter member extended between and supported from said end walls in an upright position,
   b. said cutter member having an upper side portion projected above the top sides of said end walls and a lower side portion, said upper side portion formed with a plurality of alternately arranged large and small serrations, adjacent ones of said large serrations having the upper sections thereof inclined upwardly and outwardly in opposite directions laterally of said cutter member,
   c. a mounting member for said cutter member extended between and attachable to said end walls, and
   d. means pivotally connecting the lower side portion of said cutter member to said mounting member for pivotal movement of the cutter member from said upright position, to a position within said hopper below the level of the top sides of said end walls.

* * * * *